Nov. 1, 1927.
P. GIESEN
POCKET KNIFE
Filed Oct. 1, 1926
1,647,405
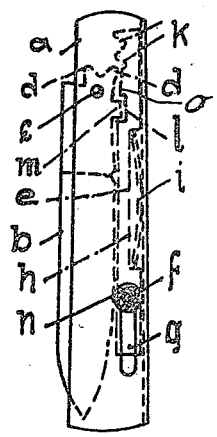
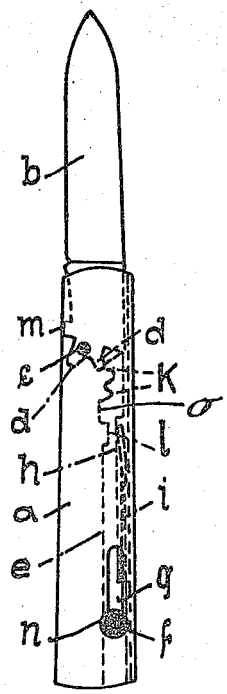
Inventor:
Paul Giesen Patented Nov. 1, 1927.

1,647,405

UNITED STATES PATENT OFFICE.

PAUL GIESEN, OF SOLINGEN, GERMANY.

POCKET KNIFE.

Application filed October 1, 1926, Serial No. 139,004, and in Germany August 17, 1925.

This invention relates to an improvement in pocket knives having a pivotal blade the pivoted end of which engages with toothlike projections in a toothing of a support movably arranged in the back of the knife handle. The novelty consists in that the support is guided by a cross-pin in slots of the side walls of the knife handle, so that the support does not project from the knife handle even in the open position of the blade.

In the accompanying drawing: Fig. 1 is a side view of the knife in its closed position and Fig. 2 a side view of the knife in its open position.

$a$ designates the handle and $b$ the blade of the pocket knife, said blade being pivoted at $c$ to said handle. The pivoted end of the blade $b$ carries two toothlike projections $d$. $e$ designates the movable support in the back of the handle $a$, said support being guided by a cross-pin $f$ in slots $g$ in the side walls of the knife handle $a$. From both sides of the handle $a$ operating knobs $n$ are arranged on the pin $f$, so that the support $e$ can be easily displaced. On its upper end the support $e$ is provided with teeth $k$ and a recess $l$.

The function of the support or rack $e$ is two fold in that it manipulates the blade in both opening and closing it as well as lock the same in either of its positions. A slight advance of the rack beyond the blade manipulating position locks the blade as hereinafter explained.

The projection $m$ on the blade forms a stop to engage the support $e$ and limit its movement.

In the closed position of the blade $b$ the tooth $d$ engages the raised surface $o$ and thereby locks the blade closed.

In the open postion of the blade $b$ a toothlike projection of the blade abuts against the front edge of the upper end of the support $e$, whereby the blade $b$ is held in its open position.

In order to prevent an unintentional movement of the support $e$, a pressure-spring $i$ is arranged in a sector $h$ of the support $e$.

What I claim, is:

In a pocket knife, the combination with a handle having slots in its side walls, a pivoted blade in said handle having its pivoted end provided with toothlike projections, and a support or rack movably arranged in the back of the handle and having teeth thereon meshing with said toothlike projections when opening and closing the blade; of a cross-pin on said support projecting through the slots for moving the support, locking surfaces on the support adjacent the tooth portion thereof to engage alternately the teeth on the pivoted end of the blade and thereby lock the blade in either open or closed position.

In testimony whereof I have hereunto set my hand.

PAUL GIESEN.